(12) United States Patent
Liu et al.

(10) Patent No.: US 8,391,537 B2
(45) Date of Patent: *Mar. 5, 2013

(54) DAMPER AND LOUDSPEAKER USING THE SAME

(75) Inventors: Liang Liu, Beijing (CN); Jia-Ping Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 316 days.

This patent is subject to a terminal disclaimer.

(21) Appl. No.: 12/824,356

(22) Filed: Jun. 28, 2010

(65) Prior Publication Data

US 2011/0038504 A1 Feb. 17, 2011

(30) Foreign Application Priority Data

Aug. 11, 2009 (CN) .......................... 2009 1 0109312

(51) Int. Cl.
*H04R 1/02* (2006.01)
(52) U.S. Cl. ...................................... 381/394; 977/949
(58) Field of Classification Search ................. 977/742, 977/902, 949; 381/394, 423
See application file for complete search history.

(56) References Cited

U.S. PATENT DOCUMENTS

| | | | |
|---|---|---|---|
| 4,312,118 A | 1/1982 | Saik et al. | |
| 6,597,798 B1 * | 7/2003 | Nakazono et al. | 381/410 |
| 6,639,993 B2 * | 10/2003 | Kemmerer et al. | 381/397 |
| 6,808,746 B1 | 10/2004 | Dai et al. | |
| 7,437,938 B2 | 10/2008 | Chakraborty | |
| 8,068,626 B2 * | 11/2011 | Jiang et al. | 381/164 |
| 8,073,164 B2 * | 12/2011 | Jiang et al. | 381/164 |
| 2004/0020681 A1 | 2/2004 | Hjortstam et al. | |
| 2004/0053780 A1 | 3/2004 | Jiang et al. | |
| 2008/0248235 A1 | 10/2008 | Feng et al. | |
| 2008/0260188 A1 * | 10/2008 | Kim | 381/190 |
| 2008/0304694 A1 | 12/2008 | Hayashi | |
| 2009/0045005 A1 * | 2/2009 | Byon et al. | 181/167 |
| 2009/0068448 A1 | 3/2009 | Liu et al. | |
| 2009/0074228 A1 | 3/2009 | Mango, III et al. | |
| 2009/0153502 A1 | 6/2009 | Jiang et al. | |
| 2009/0155467 A1 | 6/2009 | Wang et al. | |

(Continued)

FOREIGN PATENT DOCUMENTS

| | | |
|---|---|---|
| CN | 1270488 | 10/2000 |
| CN | 2488247 | 4/2002 |

(Continued)

OTHER PUBLICATIONS

"Flexible, Stretchable, Transparent Carbon Nanotube Thin Film Loudspeakers" Lin Xiao et al. Nano Letters Oct. 29, 2008.*

(Continued)

*Primary Examiner* — Jeffrey Donels
(74) *Attorney, Agent, or Firm* — Altis Law Group, Inc.

(57) ABSTRACT

A damper includes a paper matrix and a plurality of carbon nanotubes dispersed in the paper matrix. A loudspeaker includes a magnetic circuit, a bobbin, a voice coil, a damper, and a diaphragm. The magnetic circuit defines a magnetic gap. The bobbin is located in the magnetic gap. The voice coil is wounded on the bobbin. The damper is fixed to the bobbin and includes a paper matrix and a plurality of carbon nanotubes dispersed in the paper matrix. The diaphragm includes an inner rim fixed to the bobbin and mechanically held by the damper.

20 Claims, 5 Drawing Sheets

U.S. PATENT DOCUMENTS

| | | | |
|---|---|---|---|
| 2009/0160799 A1 | 6/2009 | Jiang et al. | |
| 2009/0197082 A1 | 8/2009 | Jiang et al. | |
| 2009/0220767 A1 | 9/2009 | Schlögl et al. | |
| 2009/0268559 A1* | 10/2009 | Jiang et al. | 367/140 |
| 2009/0272935 A1 | 11/2009 | Hata et al. | |
| 2009/0296528 A1* | 12/2009 | Jiang et al. | 367/140 |
| 2010/0046784 A1* | 2/2010 | Jiang et al. | 381/386 |
| 2010/0188934 A1* | 7/2010 | Qian et al. | 367/140 |

FOREIGN PATENT DOCUMENTS

| | | |
|---|---|---|
| CN | 1430785 | 7/2003 |
| CN | 2583909 | 10/2003 |
| CN | 1640923 | 7/2005 |
| CN | 101239712 | 8/2008 |
| CN | 101288336 | 10/2008 |
| CN | 101304945 | 11/2008 |
| CN | 101321410 | 12/2008 |
| CN | 101381071 | 3/2009 |
| CN | 101464759 | 6/2009 |
| CN | 101499328 | 8/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |

OTHER PUBLICATIONS

"Nanotubes made of carbon find an unexpected use" The Economist, Nov. 20, 2008.*

"Hot nanotube sheets produce music on demand" New Scientist, Oct. 31, 2008.*

Xiao et al.,Flexible, Stretchable, Transparent Carbon Nanotube Thin Film Loudspeakers,Nanoletter, vol. 8; No. 12, 4539-4545.

* cited by examiner

DAMPER AND LOUDSPEAKER USING THE SAME

CROSS-REFERENCE TO RELATED APPLICATIONS

This application claims all benefits accruing under 35 U.S.C. §119 from China Patent Application No. 200910109312.5, filed on Aug. 11, 2009, in the China Intellectual Property Office, the contents of which are hereby incorporated by reference. This application is related to commonly-assigned application entitled, "BOBBIN AND LOUDSPEAKER USING THE SAME", filed Jun. 28, 2010 Ser. No. 12/824,361.

BACKGROUND

1. Technical Field

The present disclosure relates to a damper based on carbon nanotubes, and a loudspeaker using the same.

2. Description of Related Art

A loudspeaker is an acoustic device transforming received electric signals into sounds. The electric signals have enough power to make the sounds audible to humans. There are different types of loudspeakers that can be categorized by their working principle, such as electro-dynamic loudspeakers, electromagnetic loudspeakers, electrostatic loudspeakers and piezoelectric loudspeakers. Among the various types, electro-dynamic loudspeakers have simple structures, good sound quality, and low cost, thus it is most widely used.

Electro-dynamic loudspeakers typically include a diaphragm, a bobbin, a voice coil, a damper, a magnet, and a frame. The voice coil is an electrical conductor, and is placed in the magnetic field of the magnet. By applying an electrical current to the voice coil, a mechanical vibration of the diaphragm is produced due to the interaction between the electromagnetic field produced by the voice coil and the magnetic field of the magnets, to produce sound waves.

The damper can support the voice coil so that the voice coil can move up and down without moving laterally. Also, the damper can slow the vibration of the diaphragm and protect the diaphragm from being damaged. However, the material of the damper is usually polymer, metal, or non-carbon nanotube paper. The damper made of polymer, metal, or paper has relatively low strength in the radial or lateral direction, low elasticity in the axial direction, and low endurance.

What is needed, therefore, is to provide a damper with improved strength in the radial direction, elasticity in axial direction, and endurance, and a loudspeaker using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
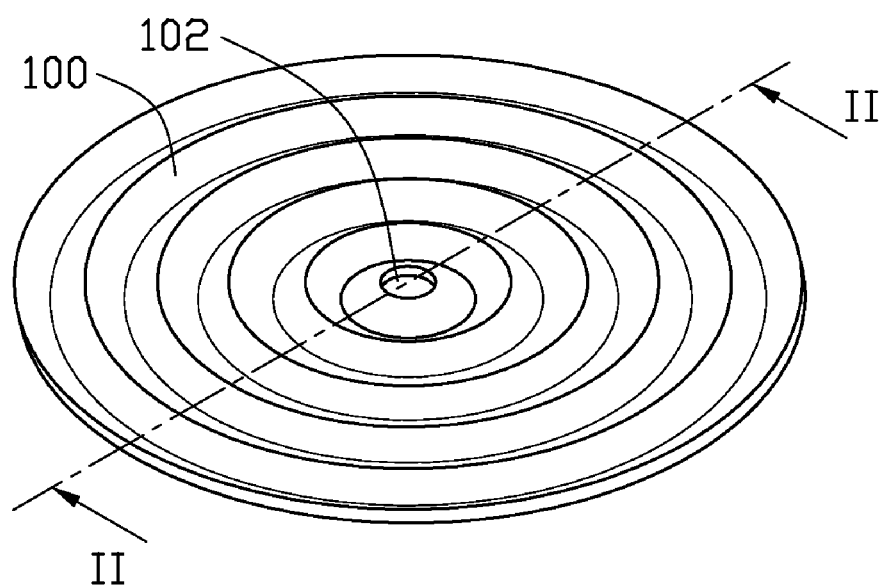
FIG. 1 is a schematic structural view of an embodiment of a damper.
Figure 2:
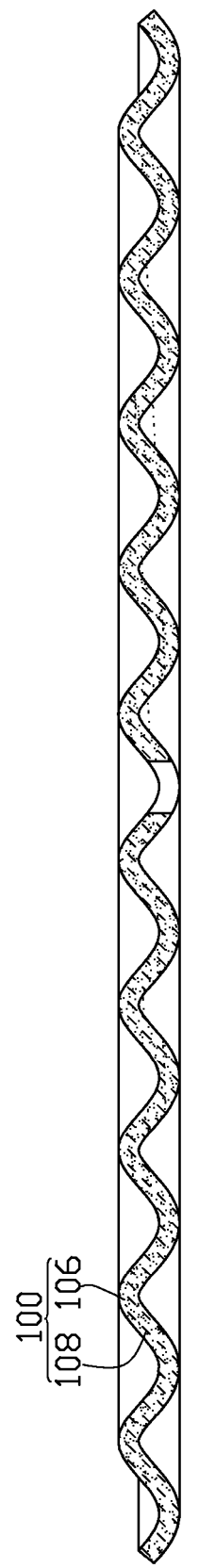
FIG. 2 is a cross-sectional view of the damper of FIG. 1, taken along line II-II.

Referring to FIGS. 1 and 2, a damper 100 of one embodiment includes a paper matrix 106 and a plurality of carbon nanotubes 108 dispersed in the paper matrix 106. A carbon nanotube paper can be formed by the paper matrix 106 and a plurality of carbon nanotubes 108 dispersed therein. The damper 100 can be a sheet-shaped carbon nanotube paper in a variety of shapes and sizes. A thickness of the damper 100 can range from about 1 micrometer to about 2 millimeters.

The paper matrix 106 can include fibers and additives. The fibers can be cellulose fibers, carbon fibers, glass fibers, nylon fibers, polypropylene fibers, cotton fibers, or bamboo fibers. The additive can be hemicellulose, lignin, resin, pigment, pectin, or ash. Any suitable fibers and additive can be used in the damper 100.

The carbon nanotubes 108 are uniformly dispersed in the paper matrix 106. The carbon nanotubes 108 can have a plurality of functional groups attached on the wall and/or end portions of the carbon nanotubes 108. The functional groups can be carboxyl groups (—COOH), hydroxy groups (—OH), nitro groups (—NO$_2$), sulfone groups (—SO$_3$H), aldehyde groups (—CHO), or amino groups (—NH$_2$). The functional groups are hydrophilic so that the carbon nanotubes 108 are soluble in a solvent and uniformly dispersed in a paper pulp during a paper making process. The carbon nanotubes 108 can be single-walled carbon nanotubes, double-walled carbon nanotubes, multi-walled carbon nanotubes, or combinations thereof. A diameter of the single-walled carbon nanotubes can range from about 0.5 nanometers to about 50 nanometers. A diameter of the double-walled carbon nanotube can range from about 1.0 nanometer to about 50 nanometers. A diameter of the multi-walled carbon nanotube can range from about 1.5 nanometers to about 50 nanometers. A length of the carbon nanotube 108 can be selected according to need. The length of the carbon nanotube 108 can be greater than 200 micrometers to give greater strength to the damper 100 if needed. In one embodiment, a length of the carbon nanotube 108 ranges from about 200 micrometers to about 900 micrometers.

A weight percentage of the paper matrix 106 in the damper 100 can range from about 10% to about 99.9%. A weight percentage of the carbon nanotubes 108 in the damper 100 can range from about 0.1% to about 90%. In one embodiment, the weight percentage of the paper matrix 106 in the damper 100 can range from about 60% to about 90% and the weight percentage of the carbon nanotubes 108 in the damper 100 can range from about 10% to about 40%. In one example, the damper 100 includes about 70% by weight of the paper matrix 106 and about 30% by weight of the carbon nanotubes 108, and the paper matrix 106 includes cellulose fibers and pectin. In another example, the damper 100 includes about 80% by weight of the paper matrix 106 and about 20% by weight of the carbon nanotubes 108, and the paper matrix 106 includes carbon fibers and resin. In another example, the damper 100 includes about 85% by weight of the paper matrix 106 and about 15% by weight of the carbon nanotubes 108, and the paper matrix 106 includes cellulose fibers. In another example, the damper 100 includes about 90% by weight of the paper matrix 106 and about 10% by weight of the carbon nanotubes 108, and the paper matrix 106 includes polypropylene fibers and pectin.

The shape and size of the damper 100 can be selected according to need. The damper 100 can be corrugated and a plurality of ridges (not labeled) and furrows (not labeled) can be defined in the damper 100. In one embodiment, the damper 100 is a corrugated round sheet having alternating circular ridges and circular furrows. A through hole 102 is defined at a center of the round sheet. A size and shape of the through hole 102 corresponds to a size and shape of a bobbin of a loudspeaker using the damper 100. The damper 100 can be made by a hot press method.

Furthermore, a plurality of wires (not shown) can be fixed on a surface of the damper 100 by, for example, an adhesive. The wires can be used to supply current to a voice coil of the loudspeaker using the damper 100.

The damper 100 made of carbon nanotube paper has at least the following advantages. Firstly, because the carbon nanotubes 108 have greater strength, the damper 100 including a plurality of carbon nanotubes 108 has greater strength in the radial or lateral direction and greater endurance. Secondly, because the carbon nanotubes 108 have greater flexibility, the damper 100 has better elasticity in the axial direction. Thirdly, because the carbon nanotubes 108 have relatively greater flame resistance and waterlogging resistance, the damper 100 including a plurality of carbon nanotubes 108 has relatively greater flame resistance and waterlogging resistance. Fourthly, because the carbon nanotubes 108 are light, the damper 100 including a plurality of carbon nanotubes 108 has relatively lower weight.

The method for making the damper 100 of one embodiment includes:

step (a), providing a paper pulp;

step (b), adding carbon nanotubes in the paper pulp to obtain a mixture;

step (c), making a damper preform using the mixture; and step (d), drying the damper preform.

In step (a), a plurality of fibers is pulped in a pulping device (not shown) to obtain paper pulp. A time for pulping the fibers can be longer than 5 hours. In one embodiment, 20 grams of cellulose fibers and 1500 grams of water are put in the pulping device to be pulped for 10 hours.

The principal functions of pulping are to dissolve lignin that holds the cellulose fibers together and to separate the cellulose fibers. The cellulose fibers that are reduced to pulp go through one of two processes. They are either mechanically ground into pulp, or reduced to a pulp by being chipped and cooked in a chemical solution. Chemical methods remove more of the residues. In the chemical process, wood chips are first cooked and heated in a digester, a closed tank operated at high temperature and pressure. In a sulfite process, the chips are pulped under steam pressure in a solution of sulfite salts. The chemical solution consists of caustic soda and sodium sulfide. Cooking time may be long, such as 12 hours. The cooked pulp is then washed to remove the chemicals and screened to remove undigested wood knots and other unwanted materials. Brief chemical cooking with mechanical treatment to separate the fibers produces a higher yield but sacrifices some of the quality of chemically pulped paper. Other machines used to clean the pulp include the vortex machine, in which the pulp is whirled rapidly so that heavy pieces of foreign matter fall to the bottom, and the centrifugal machine, in which the pulp is filtered by means of a vacuum through a wire drum that revolves in the pulp vat, making the pulp cleaner.

In step (b), a plurality of carbon nanotubes and an additive are added to the paper pulp to form a mixture, and then the mixture is kept for a period of time.

The carbon nanotubes can be obtained by a conventional method, such as chemical vapor deposition (CVD), arc discharging, or laser ablation. The carbon nanotubes can be obtained by the substeps of providing a substrate, forming a carbon nanotube array on the substrate by a chemical vapor depositing method, and peeling the carbon nanotube array off the substrate by a mechanical method, thereby achieving a plurality of carbon nanotubes. The carbon nanotubes in the carbon nanotube array are substantially parallel to each other. In one embodiment, about 3.53 grams of carbon nanotubes are added in the paper pulp, and then the mixture is kept for a period of time ranging from about 1 day to about 3 days. The mixture can be stirred while the carbon nanotubes are being added to the paper pulp.

Furthermore, the carbon nanotubes can be purified by the substeps of heating the carbon nanotubes in air flow at about 350° C. for about 2 hours to remove amorphous carbons, soaking the treated carbon nanotubes in about 36% solution of hydrochloric acid for about one day to remove metal catalysts, isolating the carbon nanotubes soaked in the hydrochloric acid, rinsing the isolated carbon nanotubes with de-ionized water, and filtrating the carbon nanotubes.

Furthermore, the carbon nanotubes can be treated with an acid with the substeps of refluxing the carbon nanotubes in nitric acid at about 130° C. for a period of about 4 hours to about 48 hours to form a suspension, centrifuging the suspension to form an acid solution with carbon nanotube sediment, and rinsing the carbon nanotube sediment with water until the pH of the used water is about 7. The carbon nanotubes can be chemically modified with functional groups such as carboxyl groups (—COOH), hydroxy groups (—OH), nitro groups (—$NO_2$), sulfone groups (—$SO_3H$), aldehyde groups (—CHO), or amino groups (—$NH_2$) on the walls and/or end portions thereof after the acid treatment. These functional groups can help the carbon nanotubes to be soluble and dispersible in the solvent.

In step (c), a damper preform is formed on a mold or a filter by a deposition method.

Figure 3:
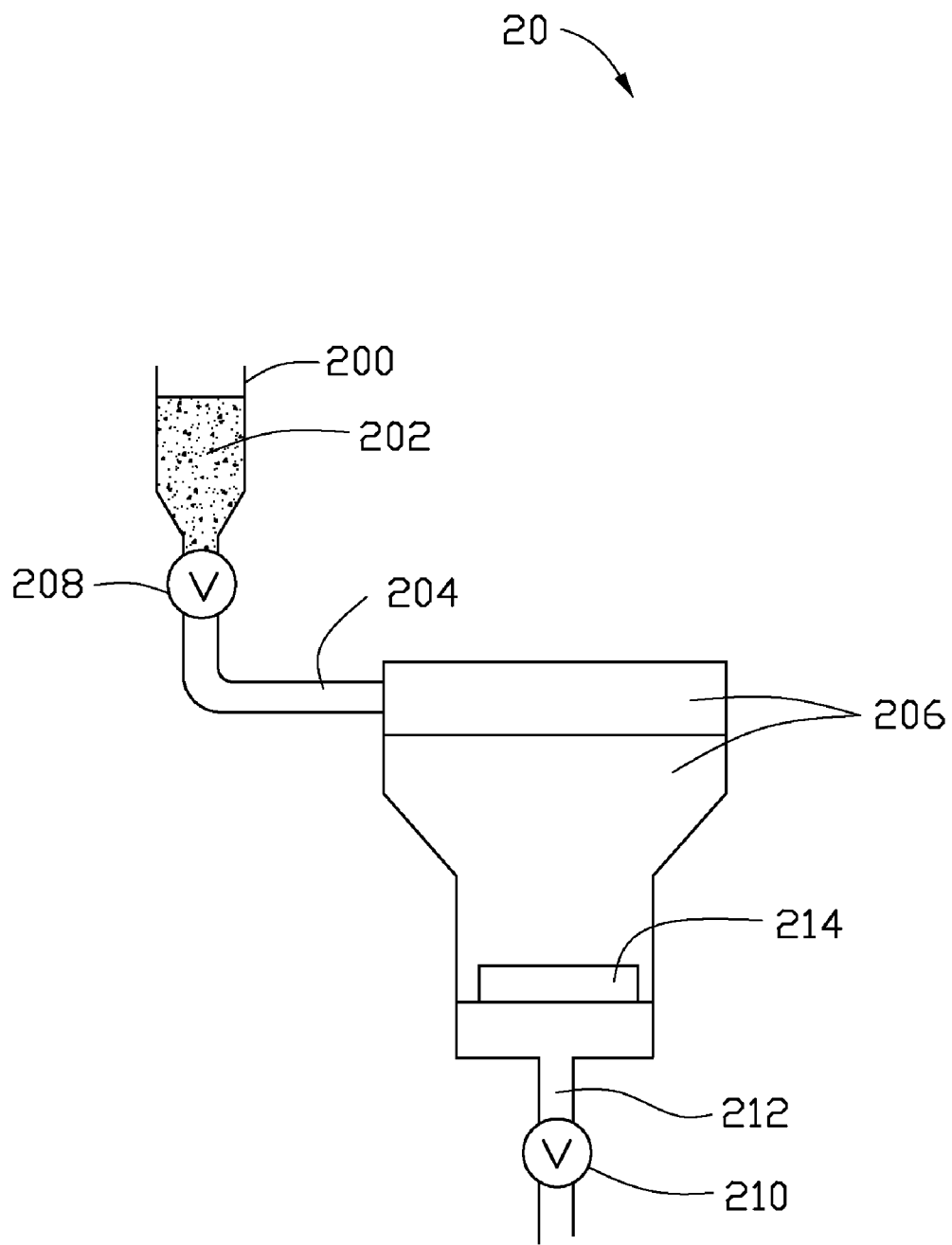
FIG. 3 is a schematic structural view of an embodiment of a paper making device.

Referring to FIG. 3, a paper making device 20 for making the damper preform in one embodiment includes a measuring bath 202, a depositing room 206, an input pipe 204, a first valve 208, an output pipe 212, a second valve 210, and a mold 214. The measuring bath 202 is connected to a top position of the depositing room 206 by the input pipe 204. The first valve 208 is disposed in the input pipe 204. One end of the output pipe 212 is connected to a bottom of the depositing room 206. The second valve 210 is disposed in the output pipe 212. The mold 214 is located on an inner bottom surface of the depositing room 206.

The mixture 200 is filled in the measuring bath 202 and then flows into the depositing room 206 through the input pipe 204. The amount of the mixture 200 entering the depositing room 206 can be controlled by the first valve 208. Some water (not shown) is filled in the depositing room 206 to dilute the mixture 200 so that the mixture 200 can be dispersed more uniformly. The water is drained through the output pipe 212 so that the mixture 200 deposits onto the mold 214. A shape and size of the damper preform depends on a shape and size of the mold 214.

In another embodiment, the mixture 200 can be diluted with water and deposited on a filter (not shown) directly to form a damper preform.

In step (d), the damper preform can be hot pressed so that the remaining water therein is vaporized. In one embodiment, the mold 214 is heated to a temperature ranging from about 100° C. to about 200° C., and a press force ranging from about 1000 newtons to about 6000 newtons is applied on the damper preform for about 10 seconds to about 100 seconds. The damper preform can also be dried in air to obtain the damper 100.

In one embodiment, a damper 100 having a through hole 102 is obtained directly by selecting a proper mold 214. In another embodiment, a damper 100 without any through hole is obtained firstly, and then a through hole 102 is formed by machining.

In step (e), forming a pattern on a surface of the damper 100 can be carried out after step (d). The pattern can be formed by coating paint or printing polymer ink so that the damper 100 is waterproof.

Figure 4:
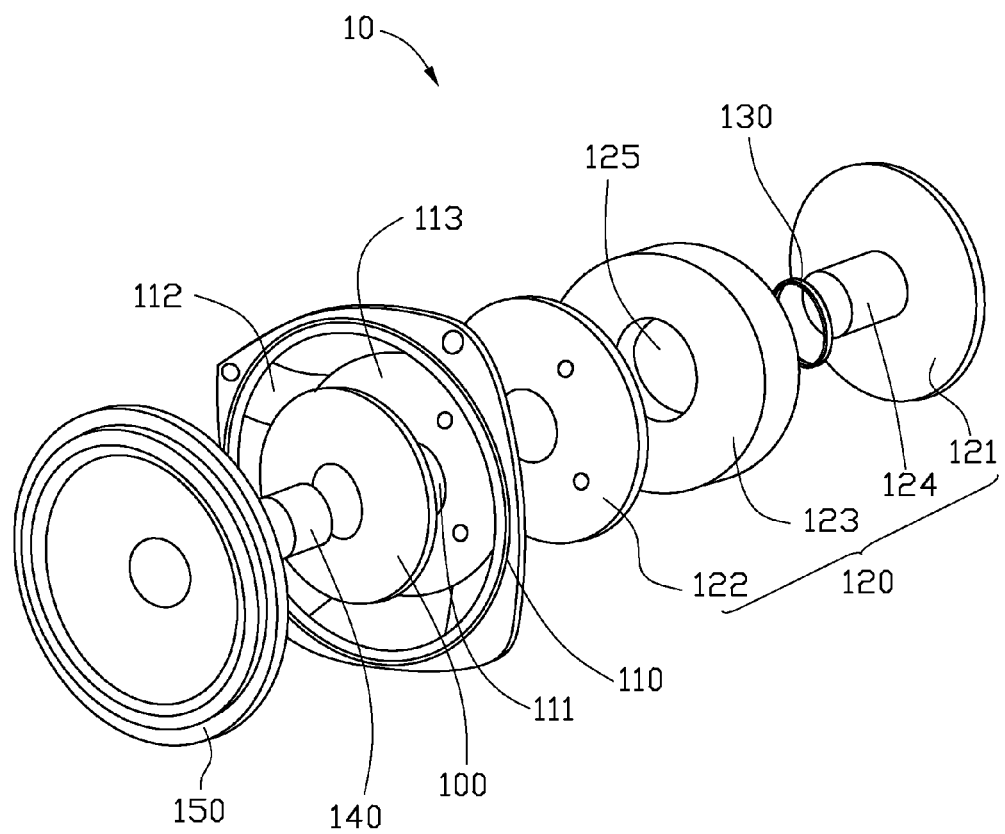
FIG. 4 is a schematic structural view of an embodiment of a loudspeaker.
Figure 5:
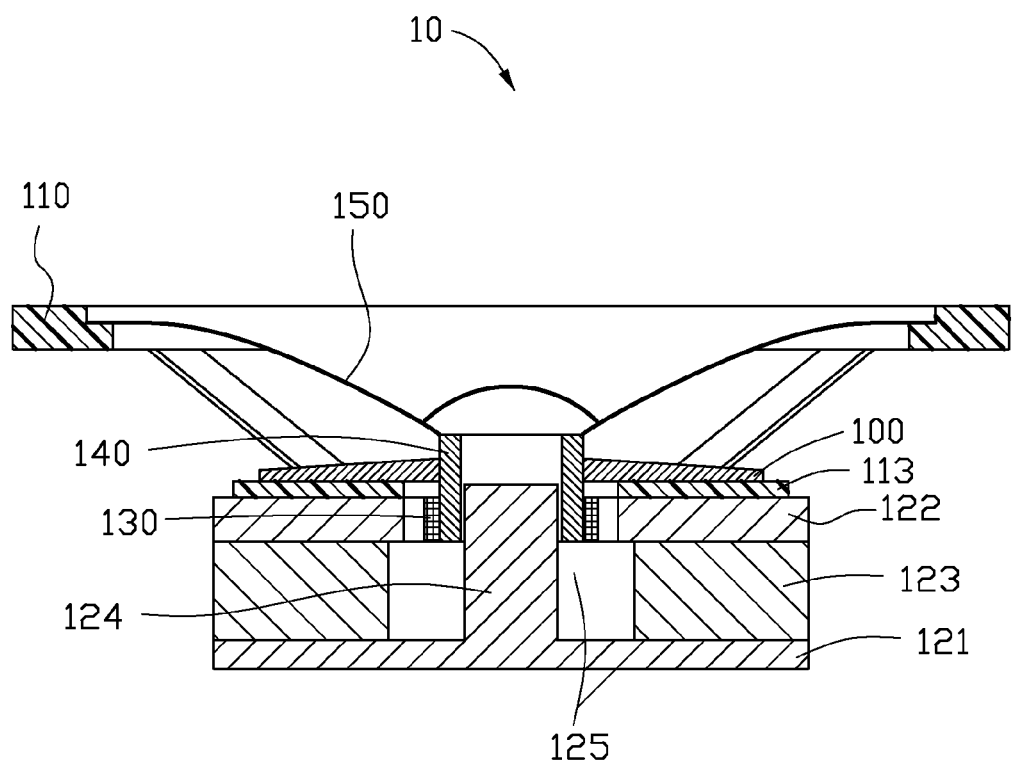
FIG. 5 is a cross-sectional view of the loudspeaker of FIG. 4.

Referring to FIGS. 4 and 5, a loudspeaker 10 of one embodiment includes a frame 110, a magnetic circuit 120, a voice coil 130, a bobbin 140, a diaphragm 150, and a damper 100.

The frame 110 is mounted on an upper side of the magnetic circuit 120. The voice coil 130 is received in the magnetic circuit 120 and wound on the bobbin 140. An outer rim of the diaphragm 150 is fixed to an inner rim of the frame 110, and an inner rim of the diaphragm 150 is fixed to an outer rim of the bobbin 140 placed in a magnetic gap 125 of the magnetic circuit 120.

The frame 110 is a truncated cone with an opening on one end and includes a hollow cavity 112 and a bottom 113. The hollow cavity 112 receives the diaphragm 150 and the damper 100. The bottom 113 has a center hole 111 to accommodate a center pole 124 of the magnetic circuit 120. The bottom 113 of the frame 110 is fixed to the magnetic circuit 120.

The magnetic circuit 120 includes a lower plate 121 having the center pole 124, an upper plate 122, and a magnet 123. The magnet 123 is sandwiched by the lower plate 121 and the upper plate 122. The upper plate 122 and the magnet 123 are both circular, and define a cylindrical space in the magnetic circuit 120. The center pole 124 is received in the space and extends through the center hole 111. The magnetic gap 125 is formed between the center pole 124 and the magnet 123. The magnetic circuit 120 is fixed on the bottom 113 at the upper plate 122.

The voice coil 130 is a driving member of the loudspeaker 10. The voice coil 130 is made of conducting wire. When electric signals are inputted to the voice coil 130, a magnetic field is formed by the voice coil 130 that varies with variations in the electric signals. The interaction of the magnetic field of the voice coil 130 and the magnetic circuit 120 induces the voice coil 130 to vibrate.

The bobbin 140 is light in weight and has a hollow structure. The center pole 124 is disposed in the hollow structure and spaced from the bobbin 140. When the voice coil 130 vibrates, the bobbin 140 and the diaphragm 150 also vibrate with the voice coil 130 to produce pressure waves heard as sound.

The diaphragm 150 has a funnel configuration and is a sound producing member of the loudspeaker 10. The diaphragm 150 can have a cone shape when used in a large loudspeaker 10. If the loudspeaker 10 is small, the diaphragm 150 can have a round or rectangular planar shape.

The diaphragm 150 is held mechanically by the damper 100. The damper 100 is fixed to the frame 110 and the bobbin 140. The damper 100 hold the voice coil 130 to freely move up and down but not left and right.

An external input terminal can be attached to the frame 110. A dust cap (not shown) can be fixed over and above a joint portion of the diaphragm 150 and the bobbin 140.

It is to be understood that, the loudspeaker 10 is not limited to the above-described structure. Any loudspeaker of any size and shape using the present diaphragm is in the scope of the present disclosure.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A damper comprising:
a paper matrix; and
a plurality of carbon nanotubes dispersed in the paper matrix.

2. The damper of claim 1, wherein the paper matrix comprises fibers and an additive.

3. The damper of claim 2, wherein the fibers are selected from the group consisting of cellulose fibers, carbon fibers, glass fibers, nylon fibers, polypropylene fibers, cotton fibers, bamboo fibers, and combinations thereof.

4. The damper of claim 2, wherein the additive is selected from the group consisting of hemicellulose, lignin, resin, pigment, pectin, ash and combinations thereof.

5. The damper of claim 1, wherein a weight percentage of the paper matrix in the damper ranges from about 10% to about 99.9%.

6. The damper of claim 5, wherein the weight percentage of the paper matrix in the damper ranges from about 60% to about 90%.

7. The damper of claim 1, wherein the carbon nanotubes are uniformly dispersed in the paper matrix.

8. The damper of claim 1, wherein the carbon nanotubes comprises a plurality of functional groups selected from the group consisting of carboxyl groups, hydroxy groups, nitro groups, sulfone groups, aldehyde groups, amino groups, and combinations thereof.

9. The damper of claim 1, wherein a length of each carbon nanotube ranges from about 200 micrometers to about 900 micrometers.

10. The damper of claim 1, wherein a weight percentage of the carbon nanotubes in the damper ranges from about 0.1% to about 90%.

11. The damper of claim 10, wherein the weight percentage of the carbon nanotubes in the damper ranges from about 10% to about 40%.

12. The damper of claim 1, wherein the damper is corrugated and defines a plurality of ridges and furrows.

13. The damper of claim 1, wherein the damper is a corrugated round sheet having alternating circular ridges and circular furrows.

14. The damper of claim 13, wherein a through hole is defined at a center of the round sheet.

15. A damper comprising a carbon nanotube paper sheet, a through hole is defined at a center of the sheet.

16. The damper of claim 15, wherein the carbon nanotube paper comprises a paper matrix and a plurality of carbon nanotubes dispersed in the paper matrix.

17. A loudspeaker comprising:
a magnetic circuit defining a magnetic gap;
a bobbin located in the magnetic gap;
a voice coil wound on the bobbin;

a damper fixed to the bobbin, the damper comprising a paper matrix and a plurality of carbon nanotubes dispersed in the paper matrix; and a diaphragm comprising an inner rim fixed to the bobbin and held mechanically by the damper.

18. The loudspeaker of claim 17, wherein a weight percentage of the paper matrix in the damper ranges from about 10% to about 99.9%.

19. The loudspeaker of claim 17, wherein the damper is corrugated and defines a plurality of ridges and furrows.

20. The loudspeaker of claim 17, wherein the damper is a corrugated round sheet having alternating circular ridges and circular furrows.

* * * * *